J. H. WAGENHORST.
VEHICLE WHEEL RIM.
APPLICATION FILED NOV. 24, 1915.
1,231,539.
Patented June 26, 1917.
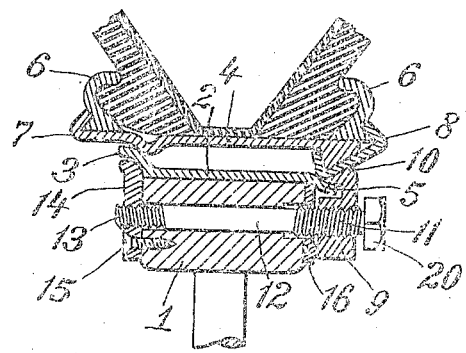
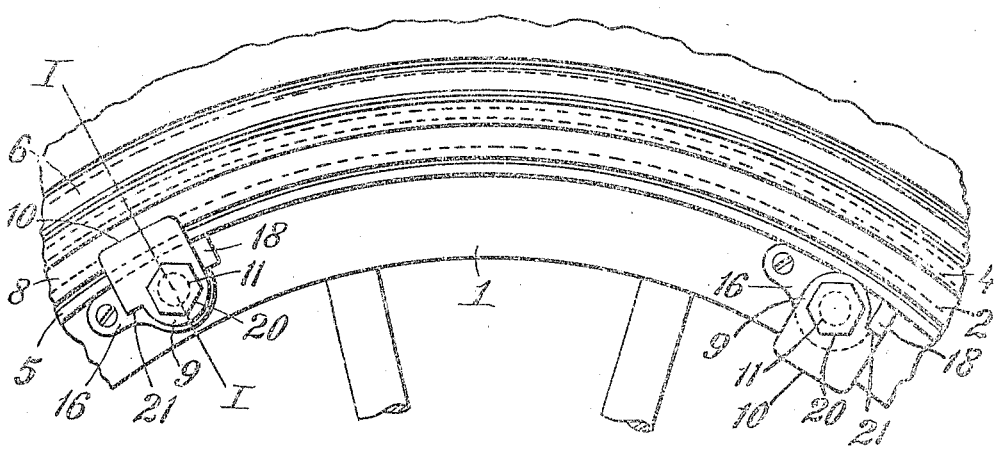
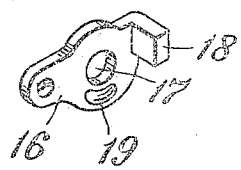
James H. Wagenhorst, Inventor
By his Attorney
Seward Davis

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,231,539.      Specification of Letters Patent.      Patented June 26, 1917.

Original application filed June 10, 1912, Serial No. 702,855. Divided and this application filed November 24, 1915. Serial No. 63,153.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

This invention relates generally to improvements in means for removably securing a demountable tire-carrying rim to a vehicle wheel, and particularly to an improved bolt construction disclosed in my co-pending application Serial Number 702,855, filed June 10, 1912, of which this application is a division, the description of those features of that application not relevant to the present invention being omitted herefrom.

In the accompanying drawings which form a part of this specification, Figure 1 is a transverse section on the line I—I of Fig. 2 through the wheel felly, felly band, tire-carrying rim and base of the tire, showing in elevation an improved bolt for securing the demountable rim keeper to the felly; Fig. 2 is a side elevation of a portion of the tire, its rim, the wheel felly, and the securing means associated therewith, in both operative and inoperative positions; and Fig. 3 is a perspective view of the plate forming part of said securing means.

Referring to the drawings in detail, the numeral 1 designates a vehicle wheel felly, which, if of wood, is preferably provided with a metallic felly band 2. At one side the felly band is provided with a raised flange 3, the outer curved surface of which forms a bearing surface upon which rests one side of the tire-carrying rim 4. At the other side the felly band is preferably bent down slightly, as indicated at 5, to form a bearing surface adapted to be engaged by the tire-carrying rim.

The tire-carrying rim is here shown as comprising a rim base and endless reversible tire-retaining flanges 6, one of which is shown as held upon the rim base by an inwardly hooked flange 7, the other being secured to the rim base by a transversely split U-shaped locking ring 8.

The tire-carrying rim is removably secured upon the felly band by means of the keepers, wedging latches, or clamps 9 having the wedge portions 10 which ride on the downwardly inclined portion 5 of the felly band 3 and wedge between the opposed bearing surface presented by it and the under-surface of the locking ring 8. The clamps 9 have internally threaded openings therethrough which screw upon threaded portions 11 of bolts 12 which extend transversely through the felly. The bolts 12 have screw-threaded end portions 13, the threads of which (right-hand, as here shown) are of opposite pitch to the threads of the portions 11 (left-hand, as here shown) of the bolts. The threaded portions 13 screw through plates 14 fixed to the back of the felly in any suitable manner, as by means of screws 15. The front of the felly has plates 16 fixed thereto having openings 17 through which the bolts pass, the plates having outwardly projecting lugs 18 which limit the rotary movement of the clamps 9. These plates are also preferably provided below the openings 17 with small bosses 19 pressed up from the metal of the plates, these bosses being engaged by the clamps when the latter are forced in, thus tending to tip the wedge portions of the clamps toward the wheel and overcoming the tendency of the clamps when screwed up to be drawn up at the bottom closer than at the top and thus bend the ends of the bolts. The operation of the clamps and bolts is similar to that of the clamps described and claimed broadly in my application for Patent Number 103637, dated July 14, 1914, filed October 29, 1910, only in the present case the bolts passing through the felly rotate, and the internally and externally threaded sleeve or nut described in my former patent becomes unnecessary. Supposing the wedge to be screwed up as shown in Fig. 1, the rotation of the bolt 12 in the proper direction counterclockwise in this case by means of a wrench applied to its head 20 will cause the screw-threaded portion 13 of the bolt to unscrew from the plate 14 and will also cause the clamp 9 to travel along the oppositely threaded portion 11 of the bolt toward the head of the nut. When the wedge portion 10 has cleared the edge of the felly band, the clamp will automatically rotate with the bolt through a half revolution, it being stopped in inverted position by the engagement of the shoulder 21 formed thereon with the lug 18, as shown at the right in Fig. 2. The rim is then free to be removed. After the rim has been replaced, it is clamped in position by rotating the bolt 12 in the opposite direction, which will first carry the clamp into erect position, and thus cause the clamp to travel along the threaded portion 11 of the bolt, while the bolt itself screws into the plate 14. The combined action of the two oppositely threaded portions of the bolt thus produces a quick flight of the clamp and rapidly draws the clamp into tight wedging engagement with the parts.

Having thus described the preferred embodiment of my invention, but without desiring to limit myself thereto, since I regard the particular bolt and clamp combination described as broadly new, I claim:

1. In a vehicle wheel, a bolt for securing a demountable rim keeper to a fixed rim, said bolt having a screw-threaded portion adjacent each end, the threads of one portion being of a pitch opposite to those of the other portion, one portion being adapted to engage said keeper and the other portion being adapted to engage said fixed rim, the rotation of said bolt in one direction causing it to advance toward said fixed rim and simultaneously to cause said keeper to approach said fixed rim at a speed equal to the travel of the bolt plus the travel of the keeper thereon.

2. In a vehicle wheel, means for removably securing a demountable rim thereto comprising keepers upon opposite sides of the wheel, and a bolt adapted simultaneously to engage with said keepers, and to draw them together by its rotation in one direction, said bolt having a screw-threaded portion adjacent each end, the threads of one portion being of a pitch opposite to those of the other portion.

3. In a vehicle wheel, a fixed rim, keepers upon opposite sides thereof, and a bolt adapted simultaneously to engage said keepers, and to cause their mutual approach by its rotation, said bolt having a screw-threaded portion adjacent each end, the threads of one portion being of a pitch opposite to those of the other portion.

4. In a vehicle wheel, means for securing a demountable rim thereto comprising a rotatable bolt having at one end an external thread engaging a complementally-threaded member on the wheel and having adjacent its other end a second external thread of opposite pitch, and an internally-threaded rim clamp engaging the second thread, the rotation of said bolt in one direction causing said member and clamp to draw together, rotation in the opposite direction causing them mutually to recede.

5. In a vehicle wheel, the combination with a felly and a demountable rim thereon of a rotatable bolt having a right-hand external thread engaging a complementally-threaded member affixed to one side of the felly, and also having a left-hand external thread, engaging a complementally threaded member riding on said bolt at the opposite side of the felly removable by rotation of the bolt to first withdraw the clamp axially from the rim and then rotate it out of operative position, and a stop on the felly for limiting said rotative movement of the clamp.

6. The combination with a vehicle wheel of a tire-carrying rim mounted on the periphery thereof, and means for removably securing the rim upon the wheel including a bolt carried by the wheel near the periphery thereof, and substantially parallel with its axis, said bolt having an end portion provided with a screw-thread and an intermediate portion provided with a screw thread, said threads being of opposite pitch, said bolt having a head by which the same may be rotated, the threaded end portion of said bolt screwing into an internally threaded opening in a portion of said wheel, and a clamp adapted to engage a portion of the removable tire-carrying rim, said clamp screwing on the intermediate threaded portion of said bolt.

7. In a vehicle wheel, in combination, a felly, a felly band thereon, a tire-carrying rim removably mounted on said felly band, said felly having a plurality of spaced holes extending transversely therethrough, a corresponding series of plates secured to the back of said felly having screw-threaded holes therethrough alined with the holes through the felly, and a plurality of bolts extending through the holes through said felly each having a screw-threaded end screwing into the hole in its opposite plate, one end of each bolt being provided with a head by which the same may be rotated, the headed end of each bolt projecting beyond the front of said felly, said projecting portion of the bolt being provided with a thread of opposite pitch from the thread at the end of said bolt, and a plurality of clamps adapted to engage portions of the removable tire-carrying rim, said clamps screwing upon said projecting threaded portions of said bolts.

8. The combination with a vehicle wheel of a tire-carrying rim removably mounted upon the periphery thereof, and means for locking said rim upon said wheel periphery, including a bolt passing transversely through said wheel near the periphery thereof, said bolt being substantially parallel with the axis of said wheel, the end of said bolt being screw-threaded and screwing into a threaded opening in a portion of the said wheel, the opposite end of said bolt projecting beyond the front side of said wheel, the projecting portion of said bolt being provided with a thread of opposite pitch from the thread at the end of said bolt, said bolt being provided with a head by which the same may be rotated, and an eccentric clamp screwing on the threaded projecting portion of said bolt, said clamp being rotatable about said bolt through a part of a revolution and being adapted to engage a portion of said removable tire-carrying rim when rotated in operative position, said clamp lying out of the path of any portion of said removable tire-carrying rim when rotated to inoperative position.

JAMES H. WAGENHORST.

Copies of this patent may be obtained for five cents each, by addressing the "Commissioner of Patents, Washington, D. C."